A. W. MAGERHANS.
Bracelet.
No. 9,192. Reissued May 4, 1880.
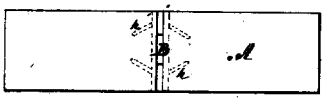
Fig. II.
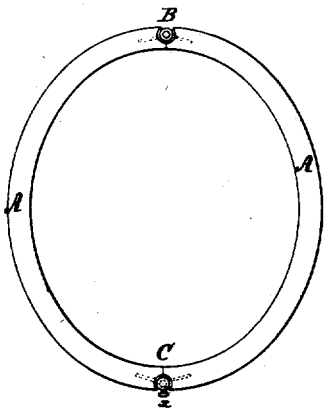
Fig. I.
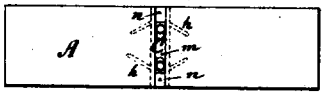
Fig. III.
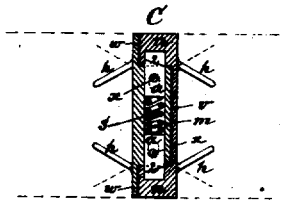
Fig. IV.
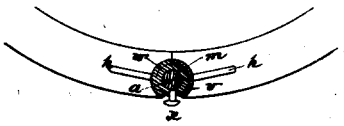
Fig. V.
Witnesses.
Henry Vinck Barron
W. H. Phelps
Inventor.
Adolph W. Magerhans.
per Henry E. Rinder
attorney.
N. PETERS, PHOTO-LITHOGRAPHER, WASHINGTON, D. C.

UNITED STATES PATENT OFFICE.

ADOLPH W. MAGERHANS, OF NEW YORK, N. Y.

BRACELET.

SPECIFICATION forming part of Reissued Letters Patent No. 9,192, dated May 4, 1880.

Original No. 221,926, dated November 25, 1879. Application for reissue filed January 28, 1880.

*To all whom it may concern:*

Be it known that I, ADOLPH W. MAGERHANS, of New York, in the State of New York, have invented a new and useful Improvement in Bracelets, of which the following is a specification.

In bracelets made of onyx or other valuable stones, or of glass in imitation of such stones, it is very desirable to show as little as possible of the gold or other metal of which the hinge and clasp are made.

My improvement consists in the construction of the clasp and hinge for bracelets made of the above-mentioned materials, or of such material as will not allow the attachment of said parts as hinge and clasp to the body of the bracelet by means of soldering.

My invention also consists in constructing a sectional bracelet with a semi-cylindrical recess formed in each end of each of its halves.

In the accompanying drawings, Figure I represents a top view of a bracelet consisting of stone or glass and embodying my invention. Fig. II is a front view, showing the clasp. Fig. III is a back view, showing the hinge. Fig. IV is a section of the clasp in an enlarged view, and Fig. V is a horizontal section of the same.

Similar letters represent similar parts in all the figures.

A A represent the body of the bracelet. B represents the hinge, and C represents the clasp. In each end of each body-section A is formed a recess of semi-cylindrical shape, adapted to receive plates *v w*. To said plates the parts forming the clasp and hinge are attached. The aforesaid recesses in the ends of said sections A can be easily cut or ground out of the material of the bracelet. To these plates projecting pins *h h*—two to each plate, and made of a yielding or somewhat flexible material, such as soft brass or silver—are securely fastened. The holes to receive these projecting pins are drilled or bored into the material forming the bracelet diagonal to each other, inclining either inwardly toward each other or turning outward, as shown by the dotted lines in Fig. IV. These pins, as above described, being made of a softer material, it will readily be understood that the same can easily be bent to enter the holes, and, by pressing the parts of the hinge or clasp farther in their proper position, will bend and follow the direction of the holes, and when in their places and the back of the plates *v* and *w* fitting exactly the corresponding recesses made in the edges of the body of the bracelet, will be held perfectly secure without the necessity of riveting these back plates to the body of the bracelet, as is usually done at present on any material which will not admit of the process of soldering. In a clasp, to one of these back plates, *w*, the central part, *m*, of the clasp is attached, and to the other back plate, *v*, the corresponding parts *n n*, fitting above and below this central part, *m*, are attached.

Into the central part, *m*, two bolts, *a a*, are fitted and acted upon by a spring, *s*, placed between them. The outer ends, 2 2, of these bolts are made beveling, inclining toward the back plate, *v*, and fitting into suitable holes in the upper and lower parts, *n n*. To the bolts *a a* projections *x x* are attached, working in longitudinal slots in the case *m*, whereby said bolts can be moved inward against the action of their spring *s*, for the purpose of withdrawing the same by one operation out of the holes in the parts *n n* whenever the clasp or bracelet requires to be opened, while the inclined surfaces 2 2 at the ends of said bolts will allow the easy closing of the clasp in the usual manner.

This construction of a clasp will allow the embedding of the same nearly all within the body of the material forming the bracelet and the bringing of the edges of the two parts of the bracelet nearly together; and, as the above-described method of attaching the hinge-leaves and back plates of the clasp to the bracelet-halves obviates any necessity of overlapping of these parts upon the material of the bracelet, I obtain thereby a bracelet showing only at each joint less than one-eighth of an inch of the metal forming said hinge or clasp and different from the material of the bracelet.

What I claim as my invention, and desire to secure by Letters Patent, is—

1. A clasp or lock consisting of the parts *m* and *n n*, in combination with two bolts, *a a*, spring *s*, and projecting pieces *x x*, arranged to operate in the manner and for the purpose substantially as described.

2. A clasp and hinge for stone or glass bracelets provided with projecting pieces *h h*, inserted into cavities or holes in the ends of the bracelet, placed obliquely with regard to each other, in the manner and for the purpose substantially as herein described.

3. A sectional bracelet having a semi-cylindrical recess formed in each end of each of its halves, substantially as set forth.

ADOLPH W. MAGERHANS.

Witnesses:
HENRY E. ROEDER,
HENRY VAN BLARCOM.